United States Patent [19]

Colin

[11] 4,020,962

[45] May 3, 1977

[54] EJECTION BOTTOM CONTROL DEVICE FOR REFUSE COLLECTION BODY

[75] Inventor: Marcel Colin, Marsilly, France

[73] Assignee: Societe d'Equipements, Manutentions et Transports (S.E.M.A.T.), Paris, France

[22] Filed: Feb. 4, 1975

[21] Appl. No.: 547,024

[30] Foreign Application Priority Data

Feb. 18, 1974 France ............................ 74.05404

[52] U.S. Cl. ............................... 214/518; 214/83.3

[51] Int. Cl.[2] ........................................... B60P 1/00

[58] Field of Search ........... 214/82, 83.3, 518, 503; 91/392, 385, 387, 216 A; 92/130 C

[56] References Cited

UNITED STATES PATENTS

| | | | |
|---|---|---|---|
| 3,049,256 | 8/1962 | Urban | 214/82 |
| 3,220,586 | 11/1965 | Gollnick | 214/83.3 X |
| 3,257,012 | 6/1966 | Berolzheimer | 214/83.3 X |
| 3,643,824 | 2/1972 | Partridge | 214/83.3 |
| 3,696,951 | 10/1972 | Toppins et al. | 214/83.3 |

*Primary Examiner*—Robert J. Spar
*Assistant Examiner*—James M. Slattery
*Attorney, Agent, or Firm*—Ulle C. Linton

[57] ABSTRACT

Device for actuating and controlling the movable bottom of a refuse collection or like body, notably in a refuse collection vehicle and for improving the performance of the main functions of such body or vehicle, by providing a uniform compression of the refuse within the body and ensuring a more reliable operation under recompression and ejection conditions, while eliminating the risk of wrong manoeuvres. This device comprises a telescopic-type hydraulic cylinder and piston actuator controlling the movements of said movable bottom, namely the compression of refuse and the development of a retaining force during the ramming of the refuse by the ramming means incorporated in the hinged door at the opposite end of the body. To this end, an automatic valve is interposed in the hydraulic circuit controlling said movable bottom, said valve remaining close as long as the pressure exerted by the refuse ramming means or the pressure exerted by the refuse against said bottom remains below a predetermined value. Said valve opens in the ejection conditions only under the control of means sensing the complete opening of the discharge door. (FIG. 3)

3 Claims, 6 Drawing Figures

EJECTION BOTTOM CONTROL DEVICE FOR REFUSE COLLECTION BODY

FIELD OF THE INVENTION

This invention relates to mechanized receptacles, containers or bodies, whether fixed or movable for collecting refuse and of the type comprising an internal slidably movable bottom acting both as a bearing or retaining end wall for the refuse to be compacted or compressed in said body and as an ejector for discharging the content of said body. This invention is applicable more particularly to the movable ejection bottom control means comprising in general a hydraulic cylinder and piston actuator acting for instance in the direction of the longitudinal center line of the body or container.

DESCRIPTION OF THE PRIOR ART

In addition to these retaining and ejection functions, the movable bottom may advantageously perform a third function consisting, during the refuse collection, in recompressing the previously collected refuse. It is highly desirable that these functions take place regularly under the control of the simplest possible means and without any risk of faulty operation in the necessary timing between these functions themselves and between these functions and the ramming or driving of the refuse into the body and/or the operation of the discharge door, the latter being generally hinged about a horizontal axis at its upper edge and carrying a refuse ramming device.

SUMMARY OF THE INVENTION

It is the essential object of the present invention to improve on the one hand the means for actuating and controlling the movable bottom of a refuse collection container or like body, and on the other hand the performance of its main functions mentioned hereinabove, by affording both a compression as regular and uniform as possible of the refuse within the body and a more reliable operation for performing the recompression and ejection steps, while eliminating the risk of wrong manoeuvers likely to cause accidents or damage the various component elements of the assembly involved.

According to a known general arrangement the movable bottom is actuated by a telescopic hydraulic cylinder and piston actuator of which the dynamic pressure develops either a retaining force causing the refuse rammed into the body to be compressed, or a recompression force, or, when required, an ejection force. However, the application of a uniform retaining fluid pressure to this telescopic actuator creates a variable retaining force increasing as the actuator piston recedes as a consequence of the increment in the cross-sectional area of the actuator telescopic element in operation; in other words, the retaining force is greater towards the end of the body filling operation, during the recession of said actuator, whereby the internal compression of refuse is not uniform. Now this constitutes a serious inconvenience and it is the primary object of this invention to eliminate this inconvenience or the causes thereof.

It is another object of the present invention to prevent an ejection manoeuvre of the ejection actuator if this may prove dangerous, for example when the discharge door is not fully open.

It is a further object of this invention to provide a movable bottom actuator control system such that it will permit a satisfactory recompression during the collection of refuse by means of the ejection actuator then subjected to an actuating or driving pressure lower than the ejection pressure.

To obtain the application of a uniform retaining force to the movable bottom, there is interposed, according to the present invention, in the hydraulic control circuit of the movable bottom actuator, an automatic valve held in its closed position as long as the pressure exerted by the refuse ramming system or the pressure exerted by the refuse against the movable bottom remains below a predetermined threshold value.

To ensure the necessary protection against wrong ejection manoeuvres the present invention contemplates the use of the same automatic valve of which the opening in the ejection conditions is controlled by means sensing the complete opening of the discharge door.

Finally, to permit the recompression of refuse by means of said movable bottom during the collection, by means of a reduced thrust exerted by said movable bottom, this invention provides another means for automatically controlling the hydraulic actuator, said means being responsive to the feed pressure and providing for said recompression a predetermined limitation of the recompression pressure, for example by causing automatically the opening of a branch line of the main hydraulic fluid supply connected to the movable bottom actuator. Furthermore, this invention contemplates the automatic neutralization of this limitation of the fluid pressure applied to the actuator, during the ejection step, said neutralization being so arranged as to eliminate at the same time any risk of wrong ejection manoeuvre by remaining under the control of a member sensing the fully-open position of the discharge door.

DESCRIPTION OF THE PREFERRED EMBODIMENTS

Figure 1:
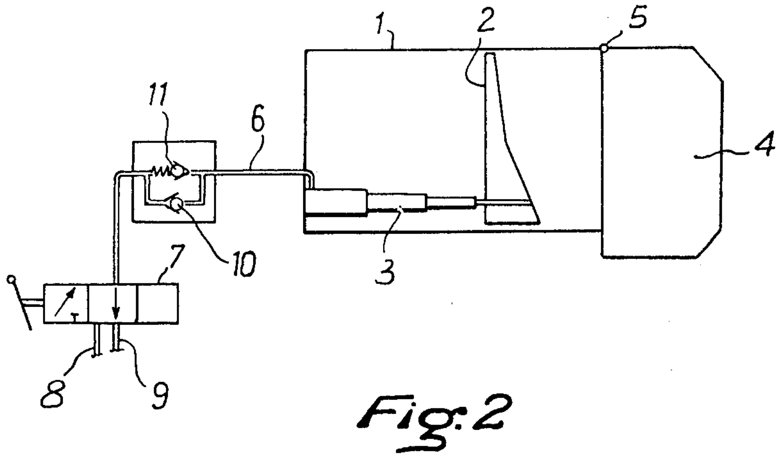
Fig. 1 PRIOR ART
FIG. 1 is a diagram illustrating the conventional system for controlling the telescopic actuator of a movable bottom of a refuse collection vehicle.

Referring first to FIG. 1 illustrating diagrammatically a refuse collection body 1 incorporated in a refuse collection vehicle and provided with a movable bottom 2, it will be seen that this bottom 2 is disposed substantially vertically and transversely in said body 1 and adapted to travel in longitudinal translation therein under the control of a telescopic hydraulic cylinder and piston actuator 3. According to a conventional arrangement, the body 1 is closed at its rear end by a discharge door 4 hinged to the body structure by means of an upper transverse shaft 5, this door incorporates the ramming member 4a, such as shown in Pat. No. 3,878,949 adapted to drive the refuse received in a hopper (not shown) rigid with said door towards the front end of body 1.

The ramming member driving the refuse into the body compresses the refuse at the same time within the space bounded at the front end of the body by the aforesaid movable bottom 2 assisting in this compression by producing a retaining reaction under the control of the telescopic actuator of which the fixed cylinder is connected via a hydraulic pipe line 6 communicating through a selector distributor 7 either with the source of fluid under pressure via the feed conduit 8 or with the hydraulic fluid reservoir via the return line 9, according to the momentary position of the selector distributor 7 having a third, neutral position in which the pipe line 6 is isolated. In the diagram of FIG. 1 the distributor 7 is shown in the position corresponding to the return of the hydraulic fluid to permit the recession (or backward movement) of the piston of actuator 3 and therefore the movement of the movable bottom 2 towards the front end of the body 1 under the thrust exerted by the refuse driven by the ram.

In this conventional construction there is interposed in the pipe line 6 a pair of by-pass non-return valves comprising on the one hand a non-return valve 10 adapted to be opened by the feed pressure (when the spool valve constituting the distributor 7 is brought to its right-hand endmost position as seen in FIG. 1) to permit the extension of actuator 3 and, on the other hand, a spring-loaded valve 11 opening automatically for draining the actuator 3 when the inner pressure of this actuator overcomes the spring load of this valve 11. It is thus clear that this valve 11 will retard the draining off of fluid from the actuator cylinder and also the movement of the movable bottom 2 to the left to enable this bottom 2 to exert on the ramming member and therefore on the refuse a retaining force subordinate to the force of the spring normally seating the valve 11 and also to the operative cross-sectional area of the actuator.

It will be seen that the retaining effort exerted by the telescopic actuator 3 varies as a function of the useful diameter of the movable portion of the actuator, according to which element of the telescopic actuator is operative, and that this effort is at its minimum value in the fully extended actuator position at the beginning of a refuse collection and at its maximum value in the fully retracted position of the actuator at the end of the collection. This leads to admit a relatively low retaining effort at the beginning of the collection and consequently to the obtaining of a non-homogeneous loading density and an improper use of the total capacity of the collection vehicle.

The present invention avoids this inconvenience by using in lieu of the spring-loaded return valve 11 an automatic two-position valve 12 monitored according to the refuse compression force so that this valve 12 remains closed to prevent the inward or backward movement of the actuator piston as long as the refuse has not attained a predetermined degree of compression, density or ramming.

Figure 2:
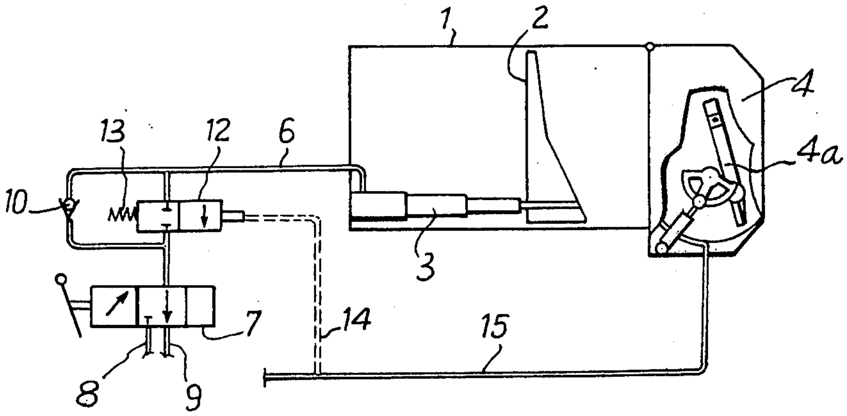
FIG. 2 is a modified diagram of the application of the system according to the present invention with a view to obtain a uniform compression of the refuse during the collection.

To this end, in the example illustrated diagrammatically in FIG. 2 the valve 12 shown in its closed position resulting from the action of return spring 13 acting upon the valve member thereof, is monitored by means of a branch line 14 connected to the hydraulic ramming circuit 15 controlling in turn the ramming member. Under these conditions it is clear that said valve 12 remains closed as long as the pressure in circuit 15 is not sufficient to overcome the force of spring 13. When the pressure in circuit 15 becomes preponderant, valve 12 opens (by moving its valve member or spool valve to the left as seen in FIG. 2), thus permitting the backward movement of the piston of actuator 3 and limiting the retaining effort to exactly the desired or preset value which remains uniform throughout the refuse collection operation.

Figure 3:
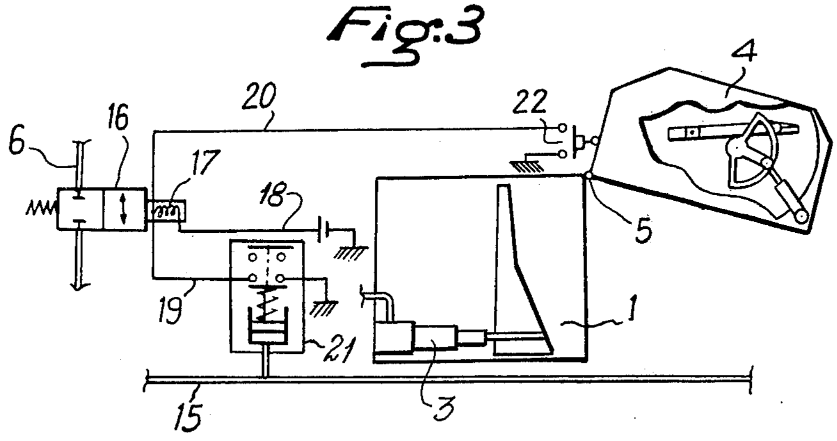
FIG. 3 illustrates diagrammatically a complementary modification further ensuring through simple means a reliable protection against a wrong ejection manoeuvre.

FIG. 3 illustrates a similar monitoring of an automatic valve 16 inserted in the pipe line 6 under the control of the fluid pressure in the ramming circuit but in this case a complementary device is used so that this automatic valve 16 replaces both the non-return valve 10 and the two-position valve 12 in order to protect the assembly against a possible wrong or untimely actuation of the movable bottom 2.

To this end the valve 16 urged to its closed position as shown is moved to its open position by energizing an electric control coil 17 supplied with electric current from a suitable source 18 through a pair of electric branch circuits 19 and 20 of which one (circuit 19) is closed by a pressure-responsive switch 21 controlled by the pressure in ramming circuit 15 and the other (circuit 20) is completed by a switch 22 closed automatically by the complete opening of the discharge door 4.

During the refuse collection the circuit 20 is opened and circuit 19 is closed by the action of the fluid pressure in the ramming circuit, thus opening valve 16 according to a mode of operation similar to that described in connection with FIG. 2. When the ejector is actuated no pressure fluid is delivered to the hydraulic ramming circuit and the electric circuit 19 is opened by switch 21 so that valve 16 opens to permit the ejection only when the complete opening of discharge door 4 has closed switch 22 to energize coil 17.

In certain cases it may be advantageous to use the ejector for recompressing the refuse during the loading operation, and this can be done by applying a reduced hydraulic pressure to the telescopic actuator 3 via the device illustrated in FIG. 4 which could be completed with a view to perform likewise the functions disclosed hereinabove with reference to FIGS. 2 and 3.

In this specific embodiment the switch controlling the fully open position of door 4 is a front contact 23 connected in series with a pressure responsive switch 24 controlled to its closed position by the pressure existing in the cylinder actuator connected to pipe line 6, by using an electric circuit 25 supplied from a source of current 26 in order to energize the opening coil 27 of a branch valve unit 28 inserted in the fluid pressure conduit 8.

Figure 4:
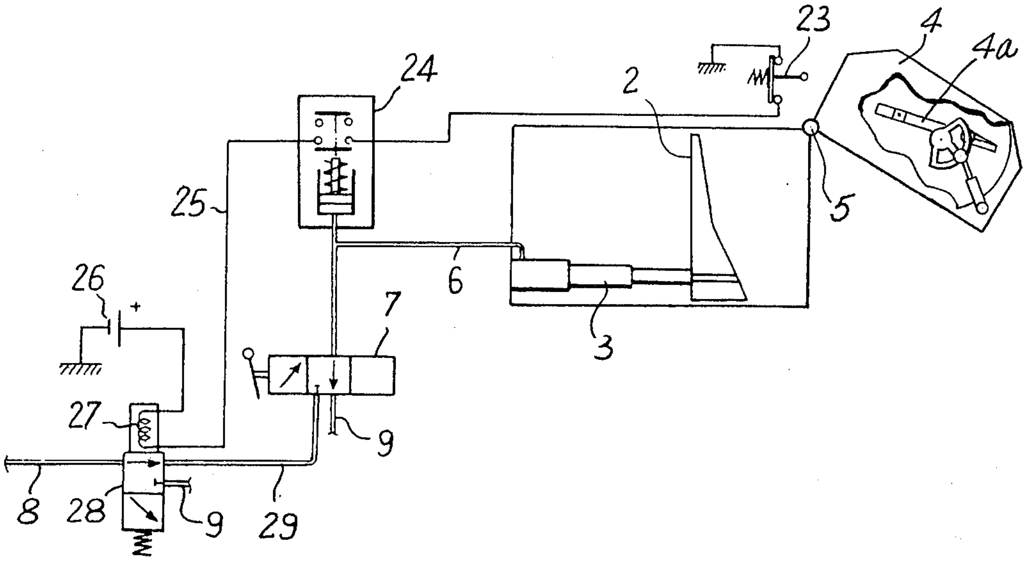
FIG. 4 illustrates another complementary modification of the movable bottom actuator control system with a view to compress the refuse during the collection thereof by means of the movable bottom, the corresponding actuator being operated under reduced and automatically controlled pressure.

When the pressure in pipe line 6 is lower than the preset value necessary to close the pressure responsive switch 24, the electric circuit 25 is opened and the valve member of valve unit 28 is returned to the position shown in FIG. 4 in which the supply conduit 8 is connected to the intermediate pressure-fluid conduit 29 supplying the distributor 7.

It will be seen that the pipe line 6 may comprise any suitable and known device for retarding the backward movement of the actuator, for example one of the devices shown in FIGS. 2 and 3.

In the recompression or ejection position the distributor 7 is moved to its endmost right-hand position to supply fluid under pressure to pipe line 6 and actuator 3. However, if contact 23 is closed, as shown in FIG. 4, the pressure in pipe line 6 is limited to the preset value causing the pressure-responsive switch 24 to close so that this switch 24 completes the electric circuit 25 through which the coil 27 is energized to bring the spool or valve member of valve unit 28 to the upper position permitting the opening of the general by-pass communicating with the return line 9 leading to the reservoir. If, on the other hand, when the door 4 is brought to its fully open position for discharging the body 1, switch 23 opens the electric circuit 25 and enables the valve 28 to resume the position shown in FIG. 4, thus causing the maximum or full ejection pressure to be restored in pipe lines 29 and 6.

Figure 5:
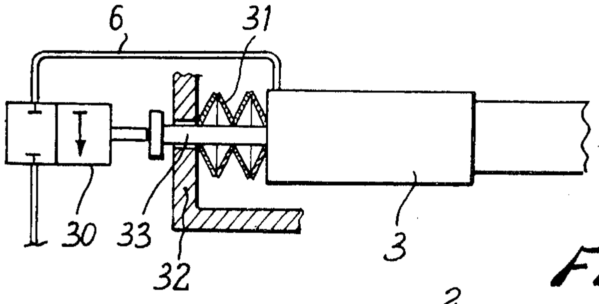
FIG. 5 is a detail view showing a modified system for regularizing the compression of the refuse rammed within the body.
Figure 6:
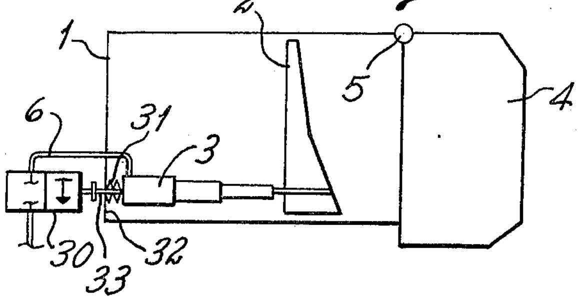
FIG. 6 illustrates diagrammatically the system of FIG. 5 on a collection vehicle.

FIG. 5 shows another arrangement for controlling the valve 30 retaining the fluid pressure in the telescopic actuator and performing the functions of valves 12 and 16 of FIGS. 2 and 3. In this example, valve 30 is no more monitored directly by the hydraulic fluid pressure prevailing in the ramming circuit; in fact, this monitoring function is devolved to the measurement of the effort exerted on the movable bottom and acting upon an elastic, compressible bellows-like member 13 interposed between the actuator 3 and the fixed bottom 32 of body 1. To this end, the cylinder of actuator 3 is connected to the spool valve of valve unit 30 through a push rod 33.

From the above description it is clear that in case of excessive increase in the effort exerted by the rammed refuse against the movable bottom 2, the compression of said elastic member 31 moves the valve 30 to the position causing the return of hydraulic fluid to the reservoir, thus permitting the movement of the movable bottom and the necessary reduction of the effort exerted against it, this reduction being attended by the return of the elastic member 31 to its initial condition and by the reclosing of valve 30.

It will be readily understood by those conversant with the art that the exemplary forms of embodiment described hereinabove with reference to the attached drawings should not be construed as limiting the scope of the invention and that more particularly the monitoring means contemplated for controlling the automatic valves incorporated in the system may be replaced by any other suitable means such as hydraulic, pneumatic, electrical or mechanical means. Besides, the various examples given herein may be combined with one another without departing from the basic principles of the invention as set forth in the appended claims.

What I claim is:

1. In a refuse collection vehicle comprising a body having a rigid forward wall, a movable bottom being slideably mounted adjacent the front end of said body, a hydraulic cylinder-and-piston actuator operatively connected to said movable bottom for ejecting the collection materials and retaining said materials when the piston of said actuator is retracted, said body further comprising at its rear end a door hinged about a transverse upper axis and provided with hydraulic means for ramming the collected materials into said body, a device for controlling said moveable ejector bottom through said actuator so as to maintain a predetermined compression of the loaded materials rammed by said ramming means incorporated in said hinged door, said device comprising an automatic valve controlling the contraction of said actuator and therefore the recession of said movable bottom, and an elastic bellows-like device associated with said automatic valve and interposed between said actuator and said rigid forward wall of said body, whereby said automatic valve cannot be opened until the force exerted by said actuator attains a value sufficient for adequately compressing said elastic bellows-like device.

2. In a refuse collection vehicle comprising a body, a movable bottom being slideably mounted adjacent the front end of said body, a hydraulic cylinder-and-piston actuator operatively connected to said movable bottom for ejecting the collected materials and retaining said materials when the piston of said actuator is retracted, said body further comprising at its rear end a door hinged about a transverse upper axis and provided with hydraulic means for ramming the collected materials into said body, a device for controlling said movable ejector bottom through said actuator so as to maintain a predetermined compression of the loaded materials rammed by said ramming means incorporated in said hinged door, said device comprising an automatic valve controlling the actuation of said actuator and therefore the recession of said movable bottom, an electric coil associated with said automatic valve and a pressure responsive switch connected on the one hand to said electric coil through an electric current source and on the other hand to a hydraulic circuit feeding said ramming means, so that said pressure responsive switch is actuated and said electric coil is energized, opening said automatic valve, when the pressure in said hydraulic circuit of the ramming means attains a predetermined maximum value, a movable switch being associated with said hinged door of said body, said movable switch closing, in the fully open position of said door, an electric circuit including said electric coil and said electric current source thus opening said automatic valve at any value of the pressure in the hydraulic circuit of said ramming means to allow the rejection stroke of said movable bottom.

3. In a refuse collection vehicle comprising a body, a movable bottom being slideably mounted adjacent the front end of said body, a hydraulic cylinder-and-piston actuator operatively connected to said movable bottom for ejecting the collected materials and retaining said materials when the piston of said actuator is retracted, said body further comprising at its rear end a door hinged about a transverse upper axis and provided with hydraulic means for ramming the collected materials into said body, a device for controlling said movable ejector bottom through said actuator so as to maintain a predetermined compression of the loaded materials rammed by said ramming means incorporated in said hinged door, said device comprising an an automatic valve controlling the contraction of said actuator and therefore the recession of said movable bottom in response to the compression force exerted on the loaded materials, a supplementary automatic valve disposed in the feed conduit of said actuator, upstream of said first automatic valve, and an electric control device for said supplementary automatic valve, said electric control device comprising an electric coil, an electric current source, and a pressure responsive switch connected to the hydraulic pipe line of said actuator and adapted to energize said electric coil and close said supplementary automatic valve when the supply pressure of said actuator attains a predetermined maximum value, said electric control device comprising a movable switch closed in the normal position of said hinged door and adapted to be engaged and moved by said hinged door of said body in the wholly open position of said door, thus opening said supplementary automatic valve at any value of the supply pressure of said actuator and allowing a rejection stoke of said movable bottom.

* * * * *